United States Patent [19]

Huber et al.

[11] Patent Number: 5,341,826
[45] Date of Patent: Aug. 30, 1994

[54] APPARATUS FOR COMPRESSING AND WASHING CONTAMINATED RAKED-OFF OR SCREENED MATERIAL, PARTICULARLY IN SEWAGE TREATMENT PLANTS

[75] Inventors: Hans G. Huber, Berching; Anton Neger, Beilngries, both of Fed. Rep. of Germany

[73] Assignee: Hans Huber GmbH, Berching, Fed. Rep. of Germany

[21] Appl. No.: 43,658

[22] Filed: Apr. 6, 1993

[30] Foreign Application Priority Data

Apr. 7, 1992 [DE]  Fed. Rep. of Germany ....... 4211657

[51] Int. Cl.$^5$ .............................................. B08B 3/04
[52] U.S. Cl. ..................................... 134/65; 134/132; 100/145
[58] Field of Search .................. 134/65, 132; 100/145; 366/322; 68/144, 145, 27

[56] References Cited

U.S. PATENT DOCUMENTS

| | | | |
|---|---|---|---|
| 1,422,309 | 7/1922 | Schweinsberg et al. | 134/65 |
| 2,091,675 | 8/1937 | Ferry | 134/65 X |
| 3,688,687 | 9/1972 | Craig et al. | 100/145 |
| 4,399,828 | 8/1983 | Kontos | 134/65 |
| 4,997,578 | 3/1981 | Berggren | 100/145 |
| 5,133,249 | 7/1992 | Zittel | 134/65 |

FOREIGN PATENT DOCUMENTS

| | | |
|---|---|---|
| 3715019 | 11/1988 | Fed. Rep. of Germany . |
| 4042167 | 11/1991 | Fed. Rep. of Germany . |
| 9109180 | 11/1991 | Fed. Rep. of Germany . |

Primary Examiner—Frankie L. Stinson
Attorney, Agent, or Firm—Hopkins & Thomas

[57] ABSTRACT

An apparatus for compressing and washing contaminated raked-off or screened material, particularly in sewage treatment plants, having a screw conveyor device with horizontal shafts (2, 3). There is a washing zone (33) with washer nozzles (34, 38) and compacting zones (21, 47) arranged before and after the washing zone. The washing zone (33) is divided into two sections (31, 32) adjacent to each other, in each of which a defined water level (35), occupying approx. ¼ to ⅓ of the height of the cross-section of the housing (1), is present. In the first section (31) of the washing zone (33), the washer nozzles (34, 36) are arranged both above and below the water level (35). In the second section (32) of the washing zone (33), the housing for the screw conveyor device is provided with openings (40) arranged laterally to define the water level.

20 Claims, 2 Drawing Sheets

APPARATUS FOR COMPRESSING AND WASHING CONTAMINATED RAKED-OFF OR SCREENED MATERIAL, PARTICULARLY IN SEWAGE TREATMENT PLANTS

FIELD OF THE INVENTION

The invention refers to an apparatus for compressing and washing contaminated raked-off or screened material, particularly in sewage treatment plants, with a screw conveyor device having a housing with feed hopper, therein a shaft mounted horizontally on bearings and provided with a drive, and a conveyor helix arranged on the shaft, and with a washing zone and washer nozzles arranged therein for the supply of wash water, as well as compacting zones, constructed without conveyor helices, arranged both before and after the washing zone. This apparatus serves in the first instance in the sector of sewage treatment plants for the washing of raked-off or screened material contaminated with faecal matter, i.e. cleaning the raked-off or screened material and, as far as possible, returning the organic constituents to the waste water circuit.

BACKGROUND OF THE INVENTION

An apparatus of the type described above is known from DE-GM 91 09 180.2. In the area of a screw conveyor device with a shaft arranged horizontally, i.e. lying down, the raked-off material, which has been separated by another device, is fed via a feed hopper into the screw conveyor device. It moves into a pre-compacting zone which is provided between feed hopper and washing zone. In the compacting zone, the shaft is constructed without a conveyor helix so that here the raked-off material fills the whole cross-section of the conveyor device and is compressed. In the subsequent mixing and washing zone, the shaft of the screw conveyor device has no conveyor helix, instead several axial mixing blades are located on the shaft and distributed over the circumference, and these brush over almost the entire open cross-section of the housing. The mixing blades can be attached to the shaft of the screw conveyor device at a pitch. They can be designed as segmental pieces. Connected downstream of the mixing and washing zone is a rising discharge pipe so that a second compacting zone is formed here. The wall of the housing for the complete screw conveyor device is provided with openings in the lower region, through which the wash water drains. The lumps of raked-off material, formed in the initial compacting zone, are broken down and crushed by the mixing blades in the mixing and washing zone, whereby the soluble, organically degradable constituents contained therein are washed out by the wash water. The disadvantage here is the breaking-down of the raked-off material and the inadequate degree of washing out because the wash water escapes unhindered through the openings in the walls of the housing so that a nominal water level cannot be built up. The use of mixing blades projecting more or less radially from the shaft brings with it the danger that raked-off material can settle on these blades and become stuck there. In particular, with the accumulation of more raked-off material, fed via the screw conveyor device and through the first compacting zone, there is the possibility that the washing zone clogs up. Interruptions to the operation are the consequence.

De-OS 37 15 019 demonstrates an apparatus for separating solid matter from fluids, in particular for separating sewage sludge. The raked-off material with the adhering faecal matter, which has been separated in another device, is fed to the separator which is constructed as a screw conveyor device with an axis arranged at an angle. The driven shaft has a continuous conveyor helix; a gap is formed between the edge of said conveyor helix and the inside wall of the housing. Washer nozzles are provided in the middle section of the axial length of the housing and these feed wash water into the inside of the apparatus. The gap between the conveyor helix and the housing becomes more or less closed off depending on the amount of the raked-off material present so that the raked-off material is enclosed by the wash water in the area of each conveyor helix and the nozzles spray onto the surface of the water so that the wash-out effect is correspondingly low.

An apparatus for removing raked-off material from fluid flowing in a channel in a sewage treatment plant is known from DE-OS 40 42 167 in which a washing zone is realized following the separator. The screw conveyor device extending through the separator and the washing zone is arranged with an axis at an angle. The shaft of the screw conveyor device supports a conveyor helix which extends through the washing zone and only ends before the compacting zone. In the area of the washing zone, washer nozzles are arranged over the axial length as well as distributed over the periphery so that wash water can be sprayed onto the contaminated raked-off material using these washer nozzles. Cropping and conveying blades, fixed on the internal periphery of the housing walls, extend throughout the washing zone so that appropriate discharge channels for the drainage of the wash water ensue between the edge of the conveyor helix and the housing. A nominal water level cannot build up here in the washing zone, instead the main washing effect is achieved through the spraying of wash water onto the raked-off material and the corresponding mixing and rearranging within the raked-off material which is already made available through the conveying effect of the screw conveyor device.

SUMMARY OF THE INVENTION

It is the object of the invention to improve the degree of wash-out of the raked-off material, i.e. to remove more contamination from the raked-off or screened material. To do this, the faecal matter which has lumped together has to be broken down and crushed in order to be able to return it to the circuit of the sewage treatment plant and retrieve the raked-off material with a high degree of wash-out, i.e. essentially clean with a reduced volume in this respect, so that it can be fed to a disposal point.

According to the invention, this is achieved with the apparatus of the aforementioned type in that the washing zone is divided into two sections adjacent to each other, in each of which a defined water level, occupying approx. $\frac{1}{4}$ to $\frac{1}{3}$ of the height of the cross-section of the housing, prevails, that in the first section of the washing zone, the washer nozzles are arranged both above and below the water level, and that in the second section of the washing zone, the housing for the screw conveyor device is provided with openings arranged laterally to define the water level. The new apparatus is based on an apparatus for compressing and washing the raked-off material and works with an axis or screw conveyor device respectively which is aligned horizontally. A washer press is provided which has two zones adjacent to each other in the area of its washing zone. In the first section of the washing zone, the aim is to achieve an intensive turbulent action on the contaminated raked-off material, in fact with a defined water level, whereby the turbulent action on the raked-off material should take place not only below the water line but also extend above the water line. For this purpose, the washer nozzles are located both above and below the water level. The washer nozzles located above the water level spray onto the accessible surface of the raked-off material which has been thoroughly stirred up. The washer nozzles located below the water level ensure an intensive movement of the raked-off material in the water. In the first section, the aim is to achieve a certain segregation. i.e. the faecal matter and the raked-off material should be separated. In doing this, smaller particles should already be detached from the raked-off material and larger lumps of faecal matter broken up and crushed without notable comminution of the raked-off material itself taking place. The conveyor helix contributes to the movement of the raked-off material and the faecal matter; said conveyor helix extends right through the first section of the washing zone and furthermore, has to supply the corresponding axial conveying effect of course. In the first section of the washing zone there is an intensive washing-out due to the rotary movement of the raked-off and screened material. The second section of the washing zone, in which a defined water level is also employed, joins onto the first section. An intensive, thorough mixing of the water is no longer necessary here. It is far more important to achieve extensive washing-out of the faecal matter which has been detached and broken down. Hence, the washer nozzles located above the water level retain their special importance. The water level is set by openings in the housing for the screw conveyor device located in the second section of the washing zone which are not provided at the lowest point of the housing walls but rather on the sides. This water level can, at the same time, also have an effect on the first section of the washing zone. After the washing zone there is then a section in which the water level drops and, finally, is completely eliminated so that the separated faecal matter can be discharged here and only the raked-off material travels into the subsequent compacting zone.

A prewash zone, in which the shaft of the screw conveyor device is provided with mixing and kneading blades, can be connected upstream of the washing zone. The prewash zone can have a water level corresponding to at least half the height of the housing cross-section. Therefore, the prewash zone forms, so to speak, a soaking zone for the contaminated raked-off or screened material. The mixing and kneading blades are driven with a certain, lower rotational speed than the screw conveyor device in order to promote the soaking process and to knead and squeeze the raked-off material well. The aim is to already achieve a breaking-down of the faecal matter at this point without comminuting the raked-off material. The water level in the prewash zone can, preferably, be designed so that the height may be adjusted in order to influence the result in the prewash zone. However, it is not intended to perform a more or less dry circulation of the raked-off material. Washer nozzles are also provided in the area of the prewash zone and these can be arranged along a rail. The washer nozzles are located above the water level and provided in such a relative position that they spray onto the surface of the water level and raked-off material which partly protrudes from the water. Therefore, separation of the faecal matter already takes place in this preliminary stage. Furthermore, the arrangement of the washer nozzles above the water level and relative to the mixing and kneading blades effects a continuous cleaning of the mixing and kneading blades to remove any raked-off material which may be adhering.

The prewash zone is usefully provided prior to the compacting zone positioned upstream of the washing zone and can be arranged partly in the area of the feed hopper. Thus, the constructional length is used which is in any case necessary for accommodating the feed hopper and the overall length of the apparatus is not increased due to the arrangement of the prewash zone. A closed housing wall is not necessary in the area of the prewash zone.

It is an advantage that the mixing and kneading blades can be located in an area of the shaft for the screw conveyor device which has a larger diameter and that they can have a shape bent opposite to the direction of rotation. The mixing and kneading blades are designed for a good circulation and kneading process and shaped in such a way that as little raked-off material as possible settles on them. Therefore, they are shaped bent over opposite to the direction of rotation. The arrangement on a section of the shaft with larger diameter eases the shaping and, incidentally, leads to benefits to the kneading and squeezing action.

The housing for the screw conveyor device in the first section of the washing zone is usefully designed as enclosed, whereby a slight draining of wash water is not a disadvantage. However, it must be ensured that the defined water level is maintained in this section. The water level must neither be too high nor too low. For this reason it is recommended that the water level also be adjustable in this section. It is possible to bring into action different water levels in the first section and the second section of the washing zone. In a simplified design, the water level in both sections is the same, whereby openings in the second section also define the level in the first section. It is useful if the second section of the washing zone is designed to be longer than the first section, whereby the arrangement of the washer nozzles in the first section is, on the other hand, provided in a narrower space than in the second section. A strong turbulent and breaking-down effect on the faecal matter is the intention in the first section, while the cleansing effect on the raked-off material is the principal concept in the second section.

Basically, it is possible to arrange a single shaft with horizontal axis to pass through the entire apparatus. However, for reasons of space it can be useful to arrange the prewash zone one side and the washing zone on the other side along two parallel shafts for the screw conveyor device. This results in the further advantage that different drives and/or at least different rotational speeds can be brought into effect on the two shafts. It is useful to drive, in particular, the first shaft with a lower rotational speed than the second shaft and/or to provide different helix angles for the conveyor helices in the area of the two shafts so that the conveyor effect runs more slowly at the first shaft than in the area of the second shaft with the washing zone. The compacting zone, upstream of the washing zone, can also be accommodated in the area of the first shaft, independently of the fact that a second compacting zone, downstream of the washing zone, is then provided in the area of the second shaft.

Mixing and conveying blades, arranged like a helix, are provided on the inside wall of the housing in the area of the prewash zone and these promote considerably the conveying effect on the raked-off material although they are fixed in position. These mixing and conveying blades work together with the mixing and kneading blades in the prewash zone.

A device specifically for breaking up the compressed, prewashed raked-off material in the compacting zone can be provided before the washing zone and after the upstream compacting zone. This device for braking up serves for feeding the prewashed and precompacted raked-off material, divided into appropriate portions, to the two sections of the washing zone and for already breaking up the raked-off material with the adhering faecal matter during this feeding so that it can be treated accordingly in the two sections in the washing zone. Cropping and conveying blades are fixed to the inside wall of the housing prior to the compacting zone and in the washing zone, i.e. throughout both areas. These cropping and conveying blades serve for ensuring the conveying effect and at the same time form channels for the passage and drainage of the wash water against the end of the washing zone or in the direction of the downstream openings in the housing wall.

BRIEF DESCRIPTION OF THE DRAWINGS

An embodiment example of the apparatus according to the invention is illustrated in the drawings and will be more closely described in the following. The drawings show.

DETAILED DESCRIPTION

Figure 1:
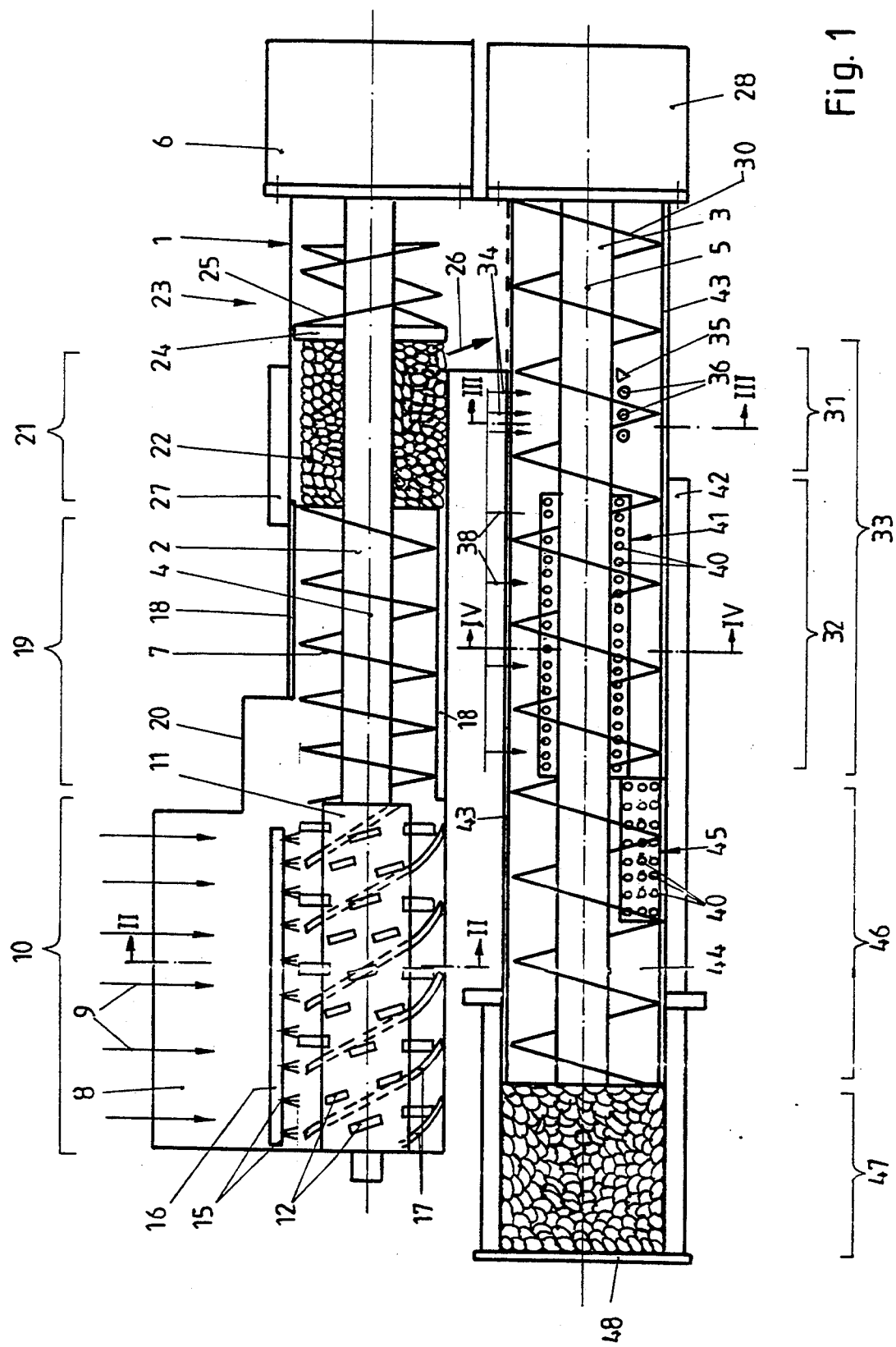
FIG. 1 a view of the apparatus, partly in section.
Figure 2:
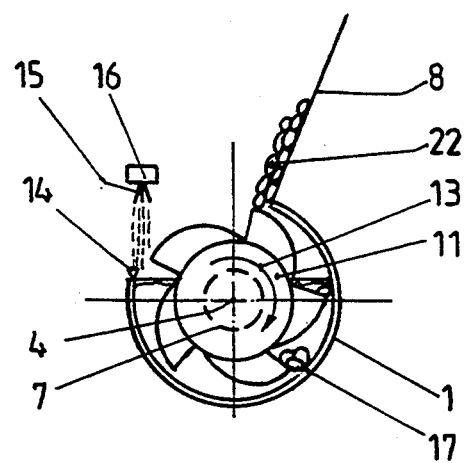
FIG. 2 a section through the prewash zone along line II—II in FIG. 1.

In the apparatus according to FIG. 1, a housing 1 is provided, not shown in all areas and located in which are two shafts 2 and 3, one on top of the other, with axes 4 and 5 arranged horizontally. Shaft 2 is driven by a motor 6. It is equipped with a conveyor helix 7 over part of its length, whereby the direction of rotation of motor 6 is selected so that conveying from left to right occurs. Housing 1 begins with a feed hopper 8, through which the contaminated raked-off and screened material, separated by another device, is fed in according to arrow 9. Below the feed hopper 8 and extending approximately over its axial length is a prewash zone 10. Shaft 2 has a section 11 with enlarged diameter right through the prewash zone 10. Mixing and kneading blades 12 are mounted on this section 11 with enlarged diameter, i.e. beginning on a relatively larger radius, and said mixing and kneading blades are provided projecting not only over the circumference but also along the length of the section 11 with enlarged diameter. The pitch of the mixing and kneading blades 12 can also be arranged in order to also achieve a certain conveying effect. The mixing and kneading blades 12 possess a special shape which can be seen in FIG. 2. They are, starting on the enlarged diameter of section 11, bent backwards against the direction of rotation 13 so that, as far as possible, no raked-off or screened material can adhere to them. The mixing and kneading blades 12 start, so to speak, on the enlarged diameter of section 11 in a tangential direction and end approximately at a diameter which also corresponds to the outside diameter of the conveyor helix 7. The mixing and kneading blades 12 have the task of thoroughly circulating the raked-off and screened material, to provide a soaking process, so to speak, and to start breaking off and breaking up the initial lumps of faecal matter from the raked-off material. The raked-off material is not to be subjected to a comminution effect. For this reason, shaft 2 can also be advantageously driven at a lower rotational speed than shaft 3. The soaking process is not carried out with the raked-off material in a dry or quasi-dry condition, but rather in water, whereby the height of the water level 14 (FIG. 2) can be designed to be adjustable. The water level should correspond to at least half the height of the cross-section in the prewash zone 10, i.e. reach up to axis 4 at least. Wash water is introduced and topped up via a series of washer nozzles 15 which can be arranged along a rail 16 extending axially, whereby the drainage for the water is not illustrated. The rail 16 with the washer sprays 15 is arranged in such a way (FIG. 2) that they reach not only the raked-off material protruding above the water level 14 but also the mixing and kneading blades 12 during their upward movement above the water level 14. The mixing and kneading blades 12 are thus subjected to a cleaning effect so that despite their special shape, any raked-off material still adhering is detached from the mixing and kneading blades 12 and returned to the circulating process in the prewash zone. A certain degree of breaking down of the faecal lumps already takes place during this circulating process. An axial conveyance of the raked-off material—albeit only to a small extent—is intended in this prewash zone 10. For this, mixing and conveying blades 17 are provided and arranged in helical fashion on the inside wall of the housing 1 in the area of the washing zone 10. FIG. 2 shows that the mixing and kneading blades 12 end at a radial separation before the mixing and conveying blades 17 so that in any case a cropping action, and hence the breaking down of the raked-off material, is avoided. The rotary movement is sufficient to promote the conveyance of the raked-off material. The raked-off material then travels in a part of the apparatus in which shaft 4 is equipped with the conveyor helix 7. In this area, guide blades 18 are arranged distributed over the periphery of the inside wall of the housing 1. A conveying zone 19 is formed here which adjoins the prewash zone 10. The housing can have an extension 20 located over the transition area so that in accordance with the water level 14, large pieces of raked-off material, for example, branches which should not and cannot be transported further, are held back.

Following the conveying zone 19 is a first compacting zone 21 which can be designated as the initial compacting zone. Shaft 2 is built here without a conveyor helix so that the raked-off material 22 becomes congested in the compacting zone 21, fills up the entire open cross-section, meaning that a lump, so to speak, is formed which is compressed, whereupon the contaminated raked-off material is subjected to a further flexing process. At the end of the compacting zone 21 facing motor 6, shaft 2 carries a device 23 specifically for breaking up the raked-off material 22 which has been compressed in the compacting zone 21. The device 23 has a shearing blade 24 with a helix 25 connected to this, the direction of rotation of which is designed to be the opposite to that of the conveyor helix 7. Helix 25 can also be arranged as multiple helix. The lump of raked-off material 22, which has formed in the compacting zone 21, is systematically divided into appropriate portions with the help of the shearing blade 24 in device 23 so that these portions of contaminated raked-off material are, so to speak, jogged (pulsed), in terms of time, over into the area of the other shaft 3 according to arrow 26. An opening (arrow 26), not illustrated here, can be made larger or smaller respectively using an adjustable housing ring 27.

Figure 3:
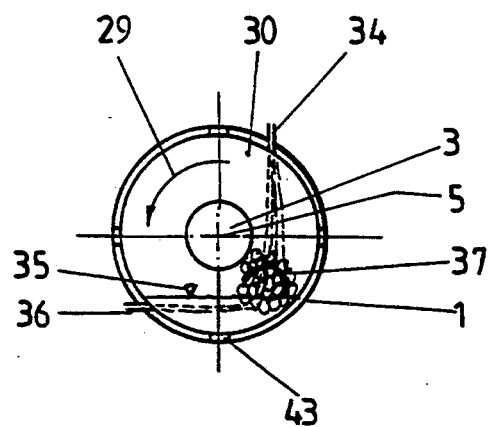
FIG. 3 a section through the first section of the washing zone along line III—III in FIG. 1, and FIG. 4 a section through the second section of the washing zone along line IV—IV in FIG. 1.
Figure 4:
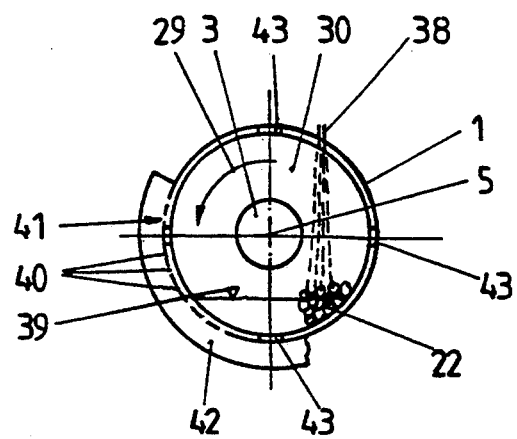

Shaft 3 is driven via motor 28, whereby the direction of rotation 29 (FIG. 3) is chosen to oppose the direction of rotation 13 of shaft 2. Shaft 3 is provided with a conveyor helix 30 over its entire axial length. A washing zone 33 is formed here which is divided into a first section 31 and a second section 32. Sections 31 and 32 can be directly adjacent to each other. FIG. 3 shows the section through the first section 31. FIG. 4 shows the section through the second section 32.

Washer nozzles 34 are located above the water level 35 in the first section 31. Washer nozzles 36 are provided below the water level 35. The water level 35 is set so that it occupies approx. ¼ to ⅓ of the height of the cross-section of the housing at this point. As can be seen from FIG. 3, the raked-off material in the water is set into a rotary motion, in particular by the action of the washer nozzles 36, so that, so to speak, winding or rolling segments form which, while continuing to circulate according to arrow 37, are reached by the water sprayed by washer nozzles 34. This brings about a further separation of the faecal matter, a break-up of the lumps of faecal matter and a concentration of the faecal matter in the water. The raked-off material already becomes markedly cleaner in this first section 31. Housing 1 is an enclosed construction in the first section 31 of the washing zone 33. This enclosed construction also extends in the direction of motor 28 into the upstream conveying zone, whereby in this area preferably no drain is provided for the water.

Washer nozzles 38, similar to the washer nozzles 34 in section 31, are provided in the second section 32 of the washing zone 33. In section 32, the water level 39 which prevails in the embodiment version described essentially coincides with the water level 35 in the first section 31. The common water level 35, 39 is essentially determined by openings 40 in a perforated plate 41 which is provided on the side (FIG. 4) of housing 1 or replaces the wall of the housing 1 at this point respectively. Housing 1 is built as an enclosed construction in the lower region. The washer nozzles 38 are arranged at a greater spacing in the axial direction than in the first section 31. They have the task of washing out a large amount of the faecal matter which has already been separated and broken up, and distribute it in the wash water detached from the raked-off material so that the faecal matter can be discharged with the wash water. The wash water flows through the openings 40 in the perforated plate 41 and into a jacket-like trough 42 which begins roughly at the start of section 32 and extends to the left up to the end of the apparatus. The inside wall of the housing 1 is provided with guide blades 43, extending continuously in an axial direction, over the entire area of shaft 3 or the conveyor helix 30 respectively. These guide blades 43 form not only flow channels (riser) for the water containing the faecal matter between the free edge of the conveyor helix 30 and the other part of the inside wall of the housing 1, but instead they represent, at the same time, a slideway for the conveyor helix 30. The guide blades 43 are only interrupted in the area of a bearing 44 for shaft 3.

Another perforated plate 45 adjoins the end of section 32 of washing zone 33; said perforated plate also has openings 40. This perforated plate 45 is in the base, i.e. located underneath. It serves to drain off much of the water so that the raked-off material can be transported into a subsequent conveying zone 46 and drained before it enters a second compacting zone 47. The compacting zone 47 extends over the entire cross-section because shaft 3 and conveyor helix 30 end at the conveying zone 46. Housing 1 has further openings in the area of compacting zone 47 so that water which has been squeezed out, and containing faecal matter, is also caught here in the trough 42 so that it can be returned to the sewage treatment circuit. A discharge opening, not illustrated here, for the washed and compacted raked-off material can be provided in the area of the compacting zone 47. In this case a flange 48 serves as a seal for housing 1. However, it is also possible to fit a rising pipe or similar here in order to intensify and prolong the ejection (squeezing-out) process and in this manner to discharge the compacted, washed raked-off material out from the apparatus.

While the preferred embodiment of the invention has been disclosed herein, it will be apparent to those skilled in the art that variations and modifications thereof can be made without departing from the spirit and scope of the invention, as set forth in the following claims.

Legend for Drawings

1 = Housing
2 = Shaft
3 = Shaft
4 = Axis
5 = Axis
6 = Motor
7 = Worm/screw conveyor device, conveyor helix
8 = Feed hopper
9 = Arrow
10 = Prewash zone
11 = Section with enlarged diameter
12 = Mixing and kneading blade
13 = Direction of rotation
14 = Water level
15 = Washer nozzle
16 = Rail
17 = Mixing and conveying blade
18 = Guide blade
19 = Conveying zone
20 = Extension
21 = Compacting zone
22 = Raked-off material
23 = Device
24 = Shearing/cropping blade
25 = Helix/screw
26 = Arrow
27 = Housing ring
28 = Motor
29 = Direction of rotation
30 = Conveyor helix, screw
31 = First section
32 = Second section
33 = Washing zone
34 = Washer nozzle
35 = Water level
36 = Washer nozzle
37 = Arrow 38 = Washer nozzle
39 = Water level
40 = Opening
41 = Perforated plate/screen
42 = Trough
43 = Guide blade
44 = Bearing
45 = Perforated plate/screen
46 = Conveying zone
47 = Compacting zone
48 = Flange

We claim:

1. Apparatus for compressing and washing contaminated raked-off or screened material, particularly in sewage treatment plants, with a screw conveyor device having a housing with fed hopper, therein a shaft mounted horizontally on bearings and provided with a drive, and a conveyor helix arranged on the shaft, and with a washing zone and washer nozzles arranged therein for the supply of wash water, as well as compacting zones, constructed without conveyor helices, arranged both before and after the washing zone, characterized in that the washing zone (33) is divided into two sections (31, 32) adjacent to each other, in each of which a defined water level (35, 39), occupying approx. ¼ to ⅓ of the height of the cross-section of the housing (1), prevails, that the washer nozzles (34, 36) are located both above and below the water level (35) in the first section (31) of the washing zone (33), and that in the second section (32) of the washing zone (33), the housing for the screw conveyor device is provided with openings (40) arranged laterally to define the water level.

2. Apparatus according to claim 1, characterized in that a prewash zone (10) is arranged upstream of the washing zone (33) and in said prewash zone the shaft (2) of the screw conveyor-device is provided with mixing and kneading blades (12), and that the prewash zone (10) has a water level (14) corresponding to at least half the height of the housing (1) cross-section.

3. Apparatus according to claim 2, characterized in that the prewash zone (10) is provided before the compacting zone (21) upstream of the washing zone (33) and is arranged at least partly in the area of the feed hopper (8).

4. Apparatus according to claim 2, characterized in that washer nozzles (15) are provided above the water level (14) in the prewash zone (10).

5. Apparatus according to claim 4, characterized in that the mixing and kneading blades (12) are arranged on a part (11) of the shaft (2) for the screw conveyor device (7) which has an enlarged diameter, wherein shaft (2) has a direction of rotation (13), and wherein said mixing and kneading blades have a shape bent opposite to said direction of rotation (13).

6. Apparatus according to claim 1, characterized in that the housing (1) for the screw conveyor device is built as a closed construction in the first section (31) of the washing zone (33).

7. Apparatus according to claim 1, characterized in that the second section (32) of the washing zone (33) is built longer than the first section (31).

8. Apparatus according claim 7, characterized in that the prewash zone (10) is arranged on one side and the washing zone (33) on the other side along two parallel shafts (2, 3) for the screw conveyor device.

9. Apparatus according to claim 8, characterized in that mixing and conveying blades (17) are provided and arranged in helical fashion on the inside wall of the housing (1) in the area of the prewash zone (10).

10. Apparatus according to claim 9, characterized in that a device (23) for systematically breaking up the raked-off material (22) compressed in the compacting zone (21) is provided before the washing zone (33) and after the upstream compacting zone (21).

11. An apparatus for compressing and washing contaminated raked-off screened material in a waste water treatment plant comprising:

a housing (1) defining a feed hopper (8) at one end of said housing;

upper and lower elongated horizontally extending conveyors (7, 30) arranged to move material from said feed hopper in a first direction in said housing along said upper helix conveyor (7) and subsequently in the opposite direction in said housing along said lower helix conveyor (30);

drive means (6, 28) for rotating said upper and lower helix conveyors;

a washing zone (33) having first (31) and second (32) sections positioned in sequence in said housing along the length of said lower helix conveyor;

a first material compacting zone (21) positioned in said housing along said upper helix conveyor upstream of said washing zone, and a second material compacting zone (47) positioned in said housing along said lower helix conveyor downstream from said washing zone;

means for maintaining a level of water (35, 39) in said washing zone between approximately one-quarter and one-third of the height of the housing (1) of said second section (32) of said washing zone (33); and a plurality of washing nozzles (34, 36) positioned in said first washing zone (31) above and below the water level (35) maintained in said first washing zone for washing the material as the material moves from said first compacting zone to said second compacting zone.

12. The apparatus of claim 11, further comprising:

a prewash zone (10) disposed in the housing (1) upstream of said washing zone (33);

wherein said prewash zone (10) comprises a plurality of mixing and kneading blades (12), and a prewash zone water level (14) within said prewash zone of at least half the height of the cross section of said housing (1) along said prewash zone.

13. The apparatus of claim 12, wherein said prewash zone (10) is located upstream of said first compacting zone (21), and wherein said prewash zone (10) is in at least partial registry with said feed hopper (8) of the housing (1).

14. The apparatus of claim 12, wherein said second section (32) of said washing zone (33) has a lateral length along said lower conveyor helix (30) greater than the lateral length of said first section (31).

15. The apparatus of claim 14, wherein said upper conveyor helix (7) has a shaft (2) and said lower conveyor helix (30) has a shaft (3), wherein said shafts (2, 3) are spaced apart and parallel to one another within said housing (1), and wherein said prewash zone (10) is located on said first shaft (2), and said washing zone (33) is located on said second shaft (3).

16. The apparatus of claim 15, further comprising a plurality of mixing and conveying blades (17) disposed in helical fashion on the inside wall of said housing (1) along said prewash zone (10).

17. The apparatus of claim 16, further comprising a device (23) for breaking up the raked off material compressed in the first compacting zone (21), and wherein said device (23) is located in said housing (1) downstream of said first compacting zone (21) and upstream of said washing zone (33).

18. The apparatus of claim 12, wherein said prewash zone (10) further comprises a plurality of washer nozzles (15) disposed within said housing above and directed toward said prewash zone water level (14).

19. The apparatus of claim 18, wherein said upper helix conveyor (7) has a shaft (2) disposed within said housing along the prewash zone, wherein said shaft has a circular cross section of an enlarged diameter (11), wherein said mixing and kneading blades (12) are disposed on the periphery of said circular cross section (11), and wherein the screw conveyor device shaft (2) rotates in a direction of rotation (13), and said mixing and kneading blades (12) are sized and shaped to bend away from said direction of rotation (13).

20. The apparatus of claim 11, wherein that portion of the housing (1) in which said first section (31) of washing zone (33) is disposed is sized and shaped to have a solid wall section for maintaining the level of water in said washing zone.

* * * * *